(12) United States Patent
Tanaka et al.

(10) Patent No.: US 10,034,484 B2
(45) Date of Patent: Jul. 31, 2018

(54) REFRIGERATION UNIT FOR CONTAINER

(71) Applicant: DAIKIN INDUSTRIES, LTD., Osaka-shi, Osaka (JP)

(72) Inventors: Naohiro Tanaka, Osaka (JP); Atsushi Ozato, Osaka (JP); Makoto Ikemiya, Osaka (JP); Tetsuya Ukon, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 7 days.

(21) Appl. No.: 15/025,202

(22) PCT Filed: Oct. 3, 2014

(86) PCT No.: PCT/JP2014/005051
§ 371 (c)(1),
(2) Date: Mar. 25, 2016

(87) PCT Pub. No.: WO2015/049878
PCT Pub. Date: Apr. 9, 2015

(65) Prior Publication Data
US 2016/0227802 A1 Aug. 11, 2016

(30) Foreign Application Priority Data
Oct. 3, 2013 (JP) .................................. 2013-208520

(51) Int. Cl.
*F25D 25/00* (2006.01)
*F24F 3/16* (2006.01)
(Continued)

(52) U.S. Cl.
CPC ................ *A23B 7/148* (2013.01); *A23B 7/04* (2013.01); *A23B 7/055* (2013.01); *F25D 11/003* (2013.01);
(Continued)

(58) Field of Classification Search
CPC ....... A23B 7/055; A23B 7/148; F25D 11/003; F25D 17/042
(Continued)

(56) References Cited

U.S. PATENT DOCUMENTS 4,642,996 A 2/1987 Harris et al.
4,716,739 A 1/1988 Harris et al.
(Continued)

FOREIGN PATENT DOCUMENTS

EP 0 368 678 A1 5/1990
EP 0687966 A2 12/1995
(Continued)

*Primary Examiner* — Henry Crenshaw
(74) *Attorney, Agent, or Firm* — Birch, Stewart, Kolasch & Birch, LLP

(57) ABSTRACT

An oxygen concentration in the interior of a container is detected by an oxygen concentration detection sensor. If the oxygen concentration detected by the oxygen concentration detection sensor is higher than that of a gas mixture, the container is supplied with the gas mixture having an oxygen concentration lower than that of the outside air and higher than a target concentration. The oxygen concentration in the interior of the container is reduced to the vicinity of the oxygen concentration of the gas mixture by supplying the interior of the container with the gas mixture, and then is further reduced to the target concentration by respiration of plants. This appropriately controls the oxygen concentration in the interior of the container, and reduces a decrease in the degree of freshness of the plants.

8 Claims, 11 Drawing Sheets

(51) Int. Cl.
  *F25D 17/00*   (2006.01)
  *B60H 1/32*    (2006.01)
  *A23B 7/148*   (2006.01)
  *A23B 7/04*    (2006.01)
  *F25D 11/00*   (2006.01)
  *F25D 17/04*   (2006.01)
  *A23B 7/055*   (2006.01)

(52) U.S. Cl.
  CPC ........ *F25D 17/042* (2013.01); *A23V 2002/00* (2013.01)

(58) Field of Classification Search
  USPC ............... 62/52.1, 62, 78, 239, 419, 179
  See application file for complete search history.

(56) References Cited

U.S. PATENT DOCUMENTS

| | | | |
|---|---|---|---|
| 4,829,774 A | 5/1989 | Wassibauer et al. | |
| 5,333,394 A * | 8/1994 | Herdeman | A23B 7/148 34/218 |
| 5,457,963 A | 10/1995 | Cahill-O'Brien et al. | |
| 5,515,693 A | 5/1996 | Cahill-O'Brien et al. | |
| 5,799,495 A * | 9/1998 | Gast, Jr. | A23B 7/148 62/239 |
| 6,460,352 B1 * | 10/2002 | Lemcoff | A23B 7/152 62/127 |
| 6,615,908 B1 | 9/2003 | Bosher et al. | |
| 2004/0035553 A1 | 2/2004 | Bosher et al. | |
| 2006/0162577 A1 * | 7/2006 | Jorgensen | A23B 7/144 99/468 |
| 2006/0199267 A1 * | 9/2006 | Savur | A23B 7/148 436/55 |
| 2007/0065546 A1 * | 3/2007 | Jorgensen | A23B 7/148 426/316 |
| 2009/0185948 A1 * | 7/2009 | Jorgensen | B65D 81/2076 422/3 |
| 2010/0189849 A1 * | 7/2010 | Tracy | A23B 7/152 426/231 |
| 2011/0151070 A1 * | 6/2011 | Bell | B65D 81/2069 426/118 |
| 2012/0294987 A1 * | 11/2012 | Bell | A23B 4/16 426/118 |
| 2013/0013099 A1 * | 1/2013 | Delele | A23B 7/148 700/214 |
| 2013/0019961 A1 * | 1/2013 | Rogers | F24F 11/0009 137/334 |
| 2016/0227802 A1 * | 8/2016 | Tanaka | A23B 7/04 |

FOREIGN PATENT DOCUMENTS

| | | |
|---|---|---|
| JP | 61-25443 A | 2/1986 |
| JP | S62-131170 A | 6/1987 |
| JP | H01296940 * | 5/1988 |
| JP | 1-296940 A | 11/1989 |
| JP | 2-84132 A | 3/1990 |
| JP | 4-41315 A | 2/1992 |
| JP | H04-093560 A | 3/1992 |
| JP | H07-147896 A | 6/1992 |
| JP | H04-262739 A | 9/1992 |
| JP | 5-180556 A | 7/1993 |
| JP | H08-000168 A | 1/1996 |
| JP | 2635535 B2 | 7/1997 |
| JP | 9-510288 A | 10/1997 |
| JP | 2010-243071 A | 10/2010 |

\* cited by examiner

REFRIGERATION UNIT FOR CONTAINER

TECHNICAL FIELD

The present invention relates to a refrigeration unit (apparatus) for container.

BACKGROUND ART

Container refrigeration apparatuses have been used to cool the interior of a container for use in, e.g., marine transportation (see, e.g., Patent Document 1).

The container is loaded with plants such as bananas and avocados. Plants perform respiration by absorbing oxygen in the air and releasing carbon dioxide even after they are harvested. If the oxygen concentration in the container is reduced to a predetermined target concentration as a result of the plant respiration, the respiration rate of the plant decreases. However, since it takes more time to reach such a target concentration, the plants will be discolored, rotten, or deteriorated in other forms in the meantime to have a decreased degree of freshness.

Patent Document 1 discloses a configuration in which the oxygen concentration in a container is quickly reduced by supplying nitrogen gas into the container. As can be seen, if the oxygen concentration of the air in the container is set to be lower than that of the outside air, the respiration rate of the plants may be reduced so much that the degree of freshness can be maintained more easily.

CITATION LIST

Patent Document

PATENT DOCUMENT 1: Japanese Patent No. 2635535

SUMMARY OF THE INVENTION

Technical Problem

If plants were placed in an environment with an excessively low oxygen concentration, the plants would have respiratory disorders and tend to deteriorate. Thus, it is necessary to appropriately control the oxygen concentration in the interior of the container.

However, according to the technique of Patent Document 1, the oxygen concentration in the interior of the container is set to be relatively low by supplying the interior of the container with nitrogen gas. As a result, this increases the magnitude of variation in the oxygen concentration in the interior of the container according to the rate of supply of the nitrogen gas so much as to cause an excessive decrease in the oxygen concentration and other inconveniences, thus making it difficult to maintain the oxygen concentration in the interior of the container at a target concentration, which is a problem.

In view of the foregoing background, it is therefore an object of the present invention to provide a technique for appropriately controlling the oxygen concentration in the interior of a container to reduce a decrease in the degree of freshness of plants.

Solution to the Problem

The following aspects of the present disclosure are directed to a container refrigeration apparatus which includes a refrigerant circuit (20) performing a refrigeration cycle, and which is attached to a container (11) that stores plants (15) to cool air in the interior of the container (11). This container refrigeration apparatus has the following features as a means for solving the problem described above.

A first aspect of the present disclosure is directed to a container refrigeration apparatus including: an oxygen concentration detector (51) which detects an oxygen concentration in the interior of the container (11); and a gas mixture supplier (30) which supplies the interior of the container (11) with a gas mixture having a higher nitrogen concentration and a lower oxygen concentration than outside air, where the oxygen concentration of the gas mixture is higher than a predetermined target concentration. The gas mixture supply device (30) is configured to: reduce the oxygen concentration in the interior of the container (11) to the vicinity of the oxygen concentration of the gas mixture by supplying the interior of the container (11) with the gas mixture if the oxygen concentration detected by the oxygen concentration detector (51) is higher than the oxygen concentration of the gas mixture; and stop supplying the gas mixture since the oxygen concentration in the interior of the container (11) has been reduced to the vicinity of the oxygen concentration of the gas mixture and until the oxygen concentration in the interior of the container (11) is reduced to the target concentration by respiration of the plants (15) absorbing oxygen in the air and releasing carbon dioxide into the air.

In the first aspect, the oxygen concentration in the interior of the container (11) is detected by the oxygen concentration detector (51). If the oxygen concentration detected by the oxygen concentration detector (51) is higher than the oxygen concentration of the gas mixture, the gas mixture is supplied to the interior of the container (11) from the gas mixture supply device (30). The gas mixture is a gas used to reduce the oxygen concentration in the interior of the container (11). The nitrogen concentration of the gas mixture is higher than that of the outside air, and the oxygen concentration of the gas mixture is lower than that of the outside air and higher than a predetermined target concentration. The supply of the gas mixture is stopped since the oxygen concentration in the interior of the container (11) has been reduced to the vicinity of the oxygen concentration of the gas mixture and until the oxygen concentration in the interior of the container (11) is reduced to the target concentration by respiration of the plants (15).

Such a configuration may appropriately control the oxygen concentration in the interior of the container (11) to reduce a decrease in the degree of freshness of the plants (15). Specifically, suppose that only nitrogen gas is supplied to the interior of the container (11) to reduce the oxygen concentration in the interior of the container (11) to a predetermined target concentration. In that case, the magnitude of variation in the oxygen concentration in the interior of the container (11) according to the rate of supply of the nitrogen gas will increase so much as to cause an excessive decrease in the oxygen concentration and other inconveniences, thus making it difficult to maintain the oxygen concentration in the interior of the container in the vicinity of a target concentration, which is a problem.

In contrast, in the first aspect, a gas mixture with a lower oxygen concentration than the outside air is supplied into the container (11). This enables reducing the magnitude of variation in the oxygen concentration in the interior of the container (11) so much as to easily maintain the oxygen concentration in the interior of the container (11) in the vicinity of a target concentration.

If the target concentration in the interior of the container (11) is an oxygen concentration of 5%, for example, allowing the gas mixture supply device (30) to produce a gas mixture including 99% of nitrogen, and 1% of oxygen would require bulky equipment and would increase the size and cost of the apparatus, which is another problem.

If a gas mixture with an higher oxygen concentration than the target concentration, e.g., a gas mixture including 90% of nitrogen and 10% of oxygen, is produced to be supplied into the container (11), the equipment does not have to be so bulky as in the case of producing a gas mixture including 99% of nitrogen and 1% of oxygen. This may reduce the size and cost of the apparatus. After the interior of the container (11) has been filled with a gas mixture including 10% of oxygen, the oxygen concentration in the interior of the container (11) may be reduced to the target concentration of 5% using the respiration of the plants (15).

A second aspect of the present disclosure is an embodiment of the first aspect of the present disclosure. In the second aspect, the gas mixture supply device (30) is configured to increase the oxygen concentration in the interior of the container (11) to the target concentration by supplying the interior of the container (11) with the gas mixture if the oxygen concentration detected by the oxygen concentration detector (51) is lower than the target concentration.

In the second aspect, if the oxygen concentration detected by the oxygen concentration detector (51) is lower than the target concentration, the gas mixture is supplied into the container (11). Thus, the deterioration of the plants (15) may be reduced by increasing the oxygen concentration in the interior of the container (11) to the target concentration.

Specifically, if plants were put in an environment having an excessively low oxygen concentration, the plants would have respiratory disorders and tend to deteriorate. Therefore, when the oxygen concentration in the container (11) goes lower than the target concentration, the interior of the container (11) may be supplied with a gas mixture with a higher oxygen concentration than the target concentration. This increases the oxygen concentration in the interior of the container (11) to the point of maintaining it in the vicinity of the target concentration, thereby avoiding the respiratory disorders of the plants (15).

A third aspect of the present disclosure is an embodiment of the first or second aspect of the present disclosure. In the third aspect, the container refrigeration apparatus further includes an intake portion (47) through which the outside air is introduced into the interior of the container (11), and the intake portion (47) is configured to increase the oxygen concentration in the interior of the container (11) to the target concentration by supplying the interior of the container (11) with the outside air if the oxygen concentration detected by the oxygen concentration detector (51) is lower than the target concentration.

In the third aspect, if the oxygen concentration in the interior of the container (11) is lower than the target concentration, the outside air is taken into the container (11) through the intake portion (47). This increases the oxygen concentration in the interior of the container (11) to the point of maintaining it in the vicinity of the target concentration, thereby avoiding the respiratory disorders of the plants (15).

A fourth aspect of the present disclosure is an embodiment of any one of the first to third aspects of the present disclosure. In the fourth aspect, the container refrigeration apparatus further includes an oxygen supplier (65) which supplies the interior of the container (11) with oxygen gas, and the oxygen supplier (65) is configured to increase the oxygen concentration in the interior of the container (11) to the target concentration by supplying the interior of the container (11) with the oxygen gas if the oxygen concentration detected by the oxygen concentration detector (51) is lower than the target concentration.

In the fourth aspect, if the oxygen concentration in the interior of the container (11) is lower than the target concentration, the interior of the container (11) is supplied with oxygen gas from the oxygen supplier (65). This increases the oxygen concentration in the interior of the container (11) to the point of maintaining it in the vicinity of the target concentration, thereby avoiding the respiratory disorders of the plants (15).

A fifth aspect of the present disclosure is an embodiment of any one of the first to fourth aspects of the present disclosure. In the fifth aspect, the container refrigeration apparatus further includes: a carbon dioxide concentration detector (52) which detects a carbon dioxide concentration in the interior of the container (11); and an exhaust portion (46) configured to exhaust the air in the interior of the container (11) out of the container (11) if the carbon dioxide concentration detected by the carbon dioxide concentration detector (52) is higher than a predetermined target concentration.

In the fifth aspect, the carbon dioxide concentration in the interior of the container (11) is detected by the carbon dioxide concentration detector. If the carbon dioxide concentration detected by the carbon dioxide concentration detector (52) is higher than a predetermined target concentration, the exhaust portion (46) exhausts the air in the interior of the container (11) out of the container (11). This enables maintaining the degree of freshness of the plants (15) by reducing the carbon dioxide concentration in the container (11) to the point of maintaining it in the vicinity of the target concentration.

Specifically, the plants (15) perform respiration to release carbon dioxide during transportation by the container (11). However, if the concentration of the carbon dioxide released becomes too high, the plants (15) will have its taste ruined or discolored, for example. Consequently, the degree of their freshness will decrease so much as to cause a significant decrease in their commercial value. Therefore, if the interior of the container (11) is ventilated to exhaust the carbon dioxide, the degree of freshness of the plants (15) may be maintained.

A sixth aspect of the present disclosure is an embodiment of any one of the first to fifth aspects of the present disclosure. In the sixth aspect, the container refrigeration apparatus further includes a carbon dioxide concentration detector (52) which detects a carbon dioxide concentration in the interior of the container (11), and the gas mixture supply device (30) is configured to supply the interior of the container (11) with the gas mixture with a higher oxygen concentration than the air in the interior of the container (11) if the carbon dioxide concentration detected by the carbon dioxide concentration detector (52) is higher than the predetermined target concentration.

In the sixth aspect, the carbon dioxide concentration in the interior of the container (11) is detected by the carbon dioxide concentration detector. If the carbon dioxide concentration detected by the carbon dioxide concentration detector (52) is higher than a predetermined target concentration, the gas mixture supply device (30) supplies the interior of the container (11) with a gas mixture with a higher oxygen concentration than the air in the interior of the container (11). This exhausts the carbon dioxide in the container (11) out of the container (11), thus allowing the apparatus to maintain the degree of freshness of the plants

(15) by reducing the carbon dioxide concentration to the point of maintaining it in the vicinity of the target concentration.

A seventh aspect of the present disclosure is an embodiment of any one of the first to sixth aspects of the present disclosure. In the seventh aspect, the container refrigeration apparatus further includes an inert gas supplier (55) which supplies the interior of the container (11) with an inert gas used to reduce the oxygen concentration in the interior of the container (11) without causing an increase in the carbon dioxide concentration in the interior of the container (11), and the inert gas supplier (55) is configured to reduce the oxygen concentration in the interior of the container (11) to the vicinity of the oxygen concentration of the gas mixture by supplying the interior of the container (11) with the inert gas before the gas mixture supply device (30) supplies the interior of the container (11) with the gas mixture.

In the seventh aspect, the oxygen concentration in the interior of the container (11) is reduced to the vicinity of the oxygen concentration of the gas mixture by supplying an inert gas into the container (11), and thereafter, is reduced to the target concentration by supplying the gas mixture. This may shorten the time it takes for the oxygen concentration to reach the target concentration compared to the case where the oxygen concentration in the interior of the container (11) is reduced to the target concentration with only the gas mixture.

An eighth aspect of the present disclosure is an embodiment of the seventh aspect of the present disclosure. In the eighth aspect, the inert gas is nitrogen gas.

In the eighth aspect, nitrogen gas may be used as the inert gas.

Advantages of the Invention

According to various aspects of the present disclosure, the interior of the container (11) is supplied with a gas mixture with a lower oxygen concentration than the outside air. This enables reducing the magnitude of variation in the oxygen concentration in the interior of the container (11) so much as to easily maintain the oxygen concentration in the interior of the container (11) in the vicinity of a target concentration.

DESCRIPTION OF EMBODIMENTS

Embodiments of the present invention will now be described in detail with reference to the drawings. The following embodiments are merely preferred examples in nature, and are not intended to limit the scope, applications, and use of the invention.

First Embodiment

Figure 1:
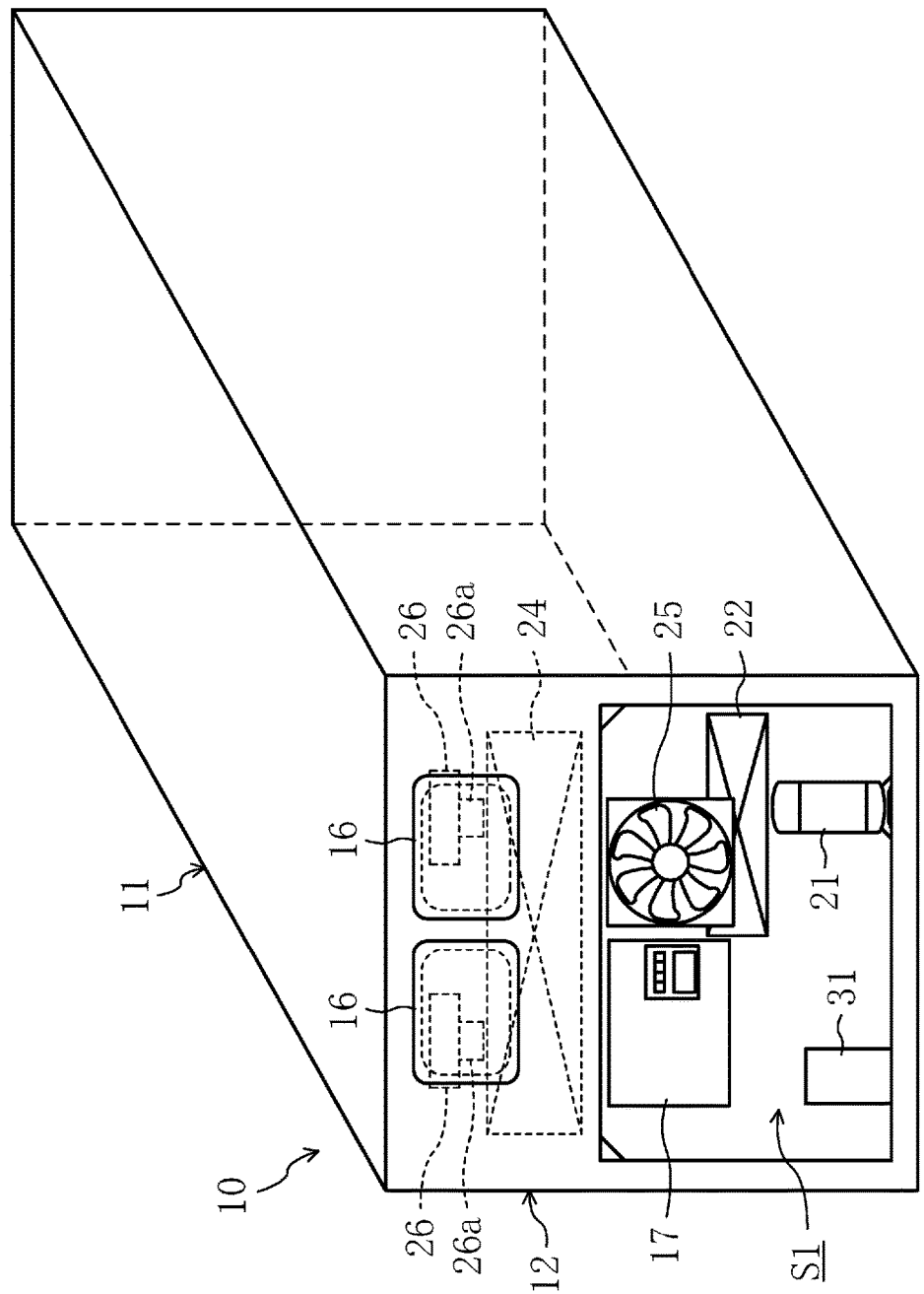
FIG. 1 is a perspective view of a container refrigeration apparatus according to a first embodiment, as viewed from the exterior of the container.
Figure 2:
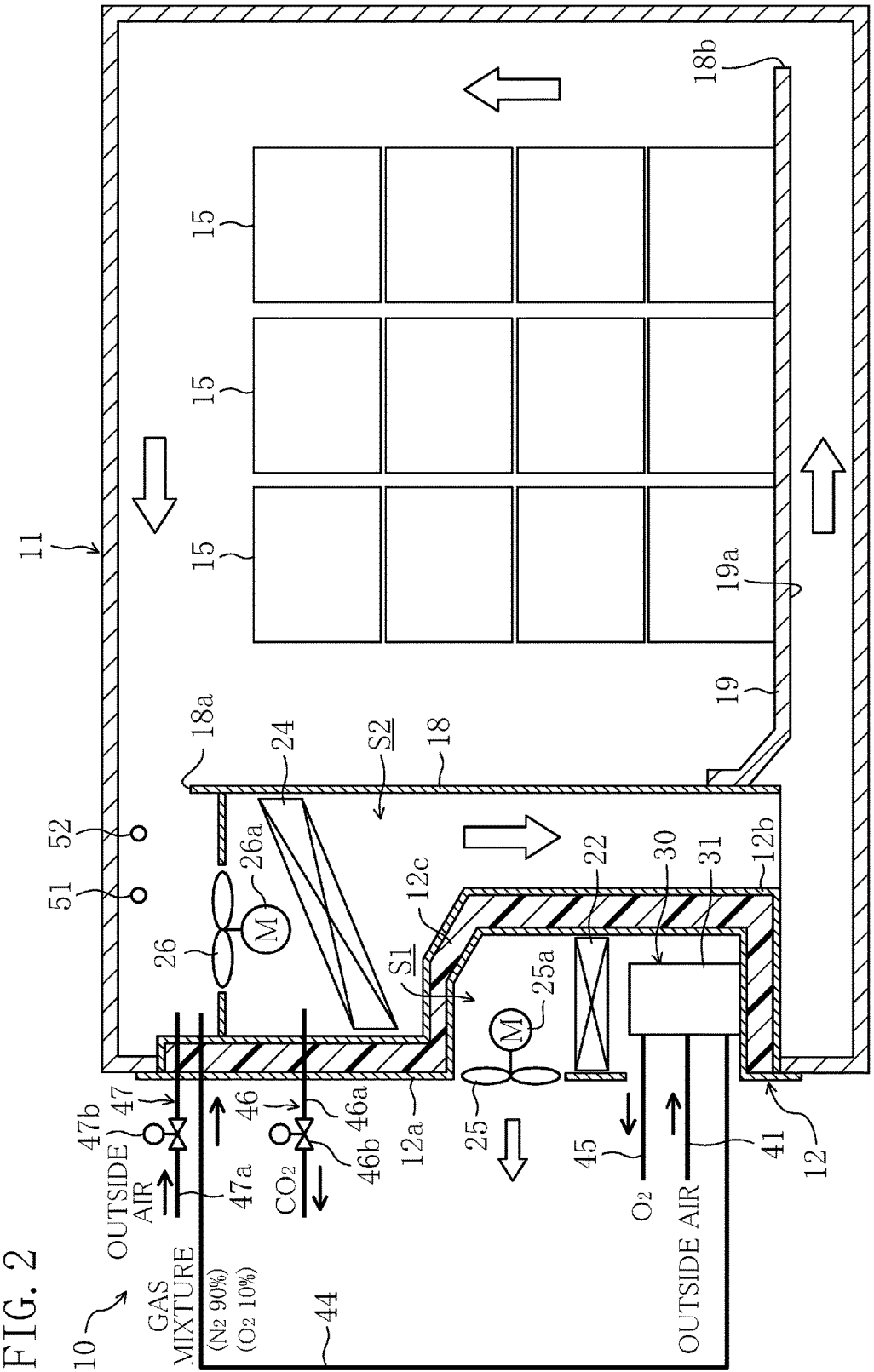
FIG. 2 is a side cross-sectional view illustrating a configuration of the container refrigeration apparatus.

As illustrated in FIGS. 1 and 2, a container refrigeration apparatus (10) performs refrigeration and freezing on the stuff stored in the interior of a container (11) for use in e.g., marine transportation. The container refrigeration apparatus (10) includes a refrigerant circuit (20) which performs a refrigeration cycle to cool air in the interior of the container (11) (see FIG. 3). In the interior of the container (11), boxed plants (15) are stored. The plants (15) perform respiration by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) is formed in the shape of a box with one open lateral end, and a casing (12) of the container refrigeration apparatus (10) is attached so as to close the one open end of the container (11). The casing (12) includes an exterior wall (12a) disposed outside the interior of the container (11) and an interior wall (12b) disposed inside the interior of the container (11). The exterior and interior walls (12a) and (12b) may be made of aluminum alloy, for example.

The exterior wall (12a) is attached to the periphery of the opening of the container (11) so as to close the open end of the container (11). The exterior wall (12a) is formed such that the lower part of the exterior wall (12a) protrudes into the interior of the container (11).

The interior wall (12b) is disposed so as to face the exterior wall (12a). The interior wall (12b) protrudes, just like the lower part of the exterior wall (12a), into the interior of the container (11). A thermal insulator (12c) fills the space between the interior and exterior walls (12b, 12a).

The lower part of the casing (12) is formed so as to protrude into the interior of the container (11). Thus, an external storage space (S1) is formed outside the interior of the container (11) and in the lower part of the casing (12), and an internal storage space (S2) is formed inside the interior of the container (11) and in the upper part of the casing (12).

The casing (12) is provided with two access doors (16) which are arranged side by side in the width direction of the casing (12), the access doors (16) being openable and closable during maintenance. An electrical component box (17) is disposed in the external storage space (S1) of the casing (12) so as to be adjacent to an exterior fan (25) which will be described later.

A partition plate (18) is disposed in the interior of the container (11). This partition plate (18) is formed in the shape of a substantially rectangular plate member, and stands upright so as to face the wall of the casing (12) inside the interior of the container (11). This partition plate (18) separates the internal storage space (S2) from the interior of the container (11).

A suction port (18a) is formed between the upper end of the partition plate (18) and the ceiling surface of the container (11). Air in the interior of the container (11) is taken into the internal storage space (S2) through the suction port (18a).

An oxygen concentration detection sensor (51) detecting an oxygen concentration in the container (11) and a carbon dioxide concentration detection sensor (52) detecting a carbon dioxide concentration in the container (11) are disposed near the suction port (18a) in the container (11). The oxygen concentration detection sensor (51) is an implementation of an oxygen concentration detector, and the carbon dioxide concentration detection sensor (52) is an implementation of a carbon dioxide concentration detector.

In the interior of the container (11), a floorboard (19) is disposed with a gap left between the floorboard (19) and the bottom surface of the container (11). On the floorboard (19), boxed plants (15) are mounted. An air flow path (19a) is formed between the floorboard (19) and the bottom surface of the container (11). A gap is also left between the lower end of the partition plate (18) and the bottom surface of the container (11), and communicates with the air flow path (19a).

A blowout port (18b) blowing the air that has been processed by the container refrigeration apparatus (10) (i.e., the air that has cooled the inside air) into the interior of the container (11) is provided at an end of the floorboard (19) near the front of the container (11) (on the right side in FIG. 2).

The container (11) is provided with an intake portion (47) through which the outside air is introduced into the container (11), and an exhaust portion (46) through which the air in the interior of the container (11) is exhausted out of the container (11). The exhaust portion (46) has an exhaust pipe (46a) connecting the interior and exterior of the container (11) together, and an exhaust valve (46b) connected to the exhaust pipe (46a). The intake portion (47) has an intake pipe (47a) connecting the interior and exterior of the container (11) together, and an intake valve (47b) connected to the intake pipe (47a).

Figure 3:
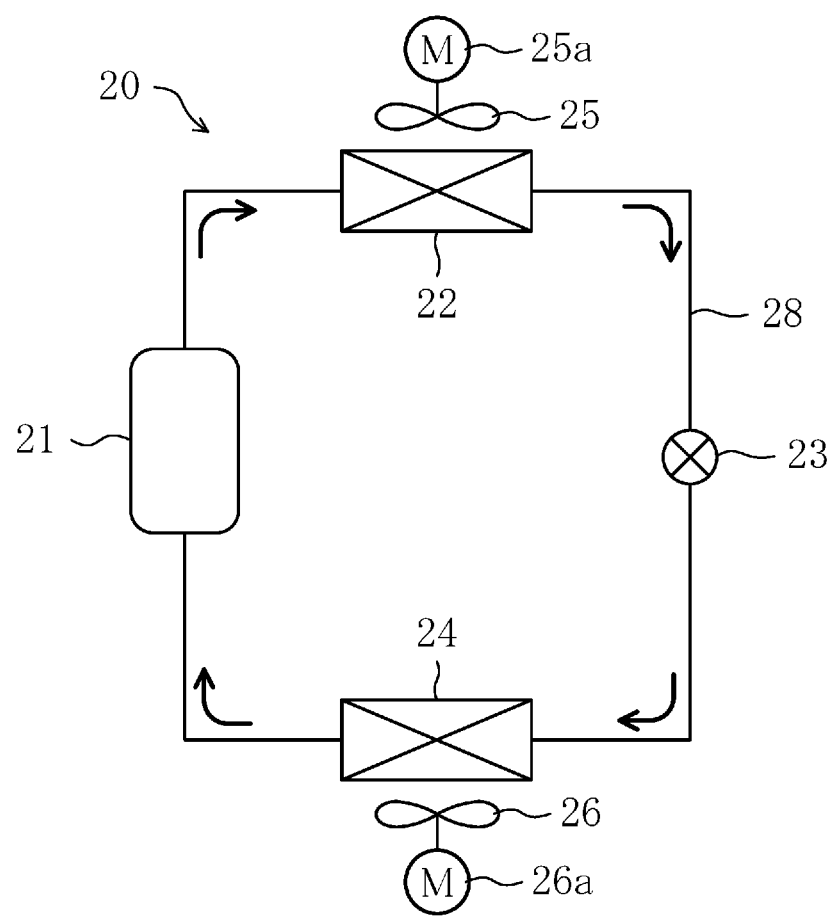
FIG. 3 is a piping system diagram illustrating the configuration of a refrigerant circuit.

As illustrated in FIG. 3, the container refrigeration apparatus (10) includes a refrigerant circuit (20) where a refrigerant circulates to perform a vapor compression refrigeration cycle. The refrigerant circuit (20) is a closed circuit in which a compressor (21), a condenser (22), an expansion valve (23), and an evaporator (24) are connected together in this order by refrigerant piping (28).

As illustrated in FIGS. 1 and 2, the compressor (21) and the condenser (22) are housed in the external storage space (S1). The exterior fan (25) is disposed above the condenser (22). The exterior fan (25) is driven in rotation by an exterior fan motor (25a), guides air in the exterior of the container (11) to the external storage space (S1) and sends it to the condenser (22). In the condenser (22), heat is exchanged between a refrigerant flowing through the condenser (22) and outside air.

The evaporator (24) is housed in the internal storage space (S2). Two interior fans (26) are disposed above the evaporator (24) in the internal storage space (S2) and arranged side by side in the width direction of the casing (12).

The interior fans (26) are driven in rotation by interior fan motors (26a), and guide the air in the interior of the container (11) through the suction port (18a) to blow the air into the evaporator (24). In the evaporator (24), heat is exchanged between a refrigerant flowing through the evaporator (24) and the inside air. The inside air which has dissipated heat to the refrigerant to be cooled when passing through the evaporator (24) passes through the air flow path (19a) and is blown into the container (11) via the blowout port (18b).

The container refrigeration apparatus (10) includes a gas mixture supply device (30) supplying the interior of the container (11) with a gas mixture with a low oxygen concentration. In this embodiment, a gas mixture is produced by vacuum pressure swing adsorption (VPSA) process.

Figure 4:
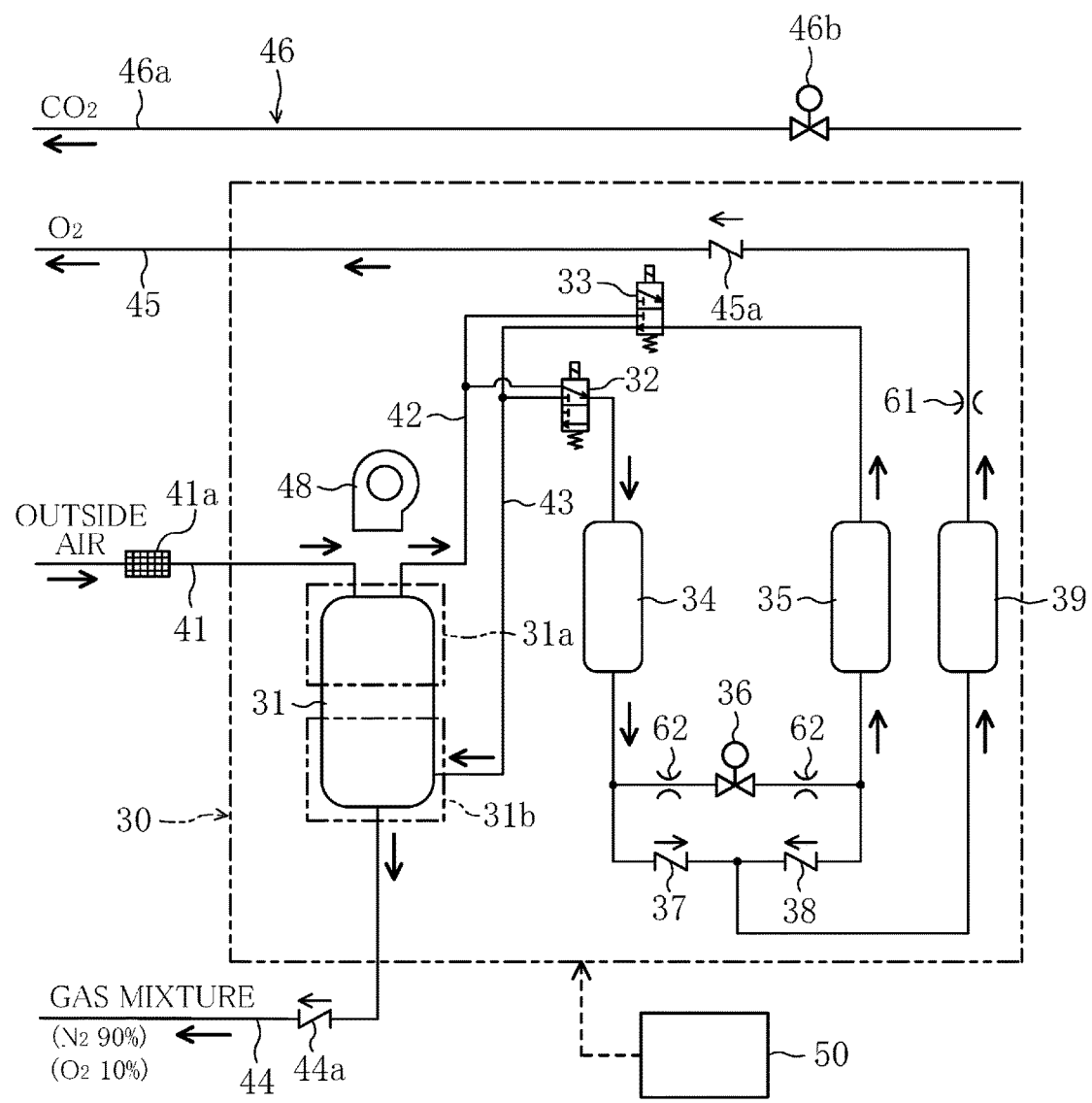
FIG. 4 is a piping system diagram illustrating the configuration of a gas mixture supply device.

As illustrated in FIG. 4, the gas mixture supply device (30) functioning as a gas mixture supplier includes an air compressor (31), first and second directional control valves (32) and (33), first and second adsorption columns (34) and (35) each provided with an adsorbent for adsorbing nitrogen in the air, a purge valve (36), first and second check valves (37) and (38), and an oxygen tank (39).

The air compressor (31) is disposed in the external storage space (S1), and sucks outside air through an inflow passage (41) connected to the exterior of the container (11) to compress the air. This air compressor (31) functions as a pressurization portion (31a) pressurizing one of the first and second adsorption columns (34) and (35) by supplying this adsorption column with the compressed air through an outflow passage (42) to perform an adsorption operation of adsorbing nitrogen in the air onto the adsorbent. An air filter (41a) is attached to a midway point of the inflow path (41).

This air compressor (31) also functions as a depressurization portion (31b) depressurizing the other of the first and second adsorption columns (34) and (35) by sucking the air from this adsorption column through a suction passage (43) to perform a desorption operation of desorbing the nitrogen that is adsorbed onto the adsorbent. It is recommended that, during the desorption operation, depressurization be performed by reducing the pressure to a negative pressure.

The pressurization portion (31a) and depressurization portion (31b) of the air compressor (31) are configured as oil-less pumps without lubricant oil. Here, suppose that oil is used in the pump of the pressurization portion (31a). In such a situation, when one of the first and second adsorption columns (34) and (35) is pressurized by being supplied with the compressed air, the oil included in the compressed air is adsorbed onto the adsorbent, resulting in a decrease in the adsorption performance of the adsorbent.

On the other hand, if oil is used in the pump of the depressurization portion (31b), the oil is supplied to the interior of the container (11) together with the gas mixture including nitrogen desorbed from the other of the first and second adsorption columns (34) and (35). As a result, the gas mixture with oily odor is supplied to the interior of the container (11) loaded with plants (15).

Thus, this embodiment may overcome such a disadvantage by implementing the pressurization portion (31a) and depressurization portion (31b) of the air compressor (31) as oil-less pumps.

A blower fan (48) is disposed above the air compressor (48) to cool the air compressor (31) by blowing air toward the air compressor (31).

The first and second directional control valves (32) and (33) are used to alternately switch the targets of adsorption and desorption operations between the first and second adsorption columns (34) and (35). In the state illustrated in FIG. 4, the adsorption operation is performed on the first adsorption column (34), and the desorption operation is performed on the second adsorption column (35).

If the positions of the first and second directional control valves (32) and (33) are opposite from those in FIG. 4, the adsorption operation is performed on the second adsorption column (35) and the desorption operation is performed on the first adsorption column (34) although not illustrated. The above described process is repeatedly performed while interchanging the targets of the adsorption and desorption operations between the first and second adsorption columns (34) and (35), thereby continuously producing a gas mixture in a stable manner. This switching operation is controlled by a controller (50).

The first and second adsorption columns (34) and (35) produce an oxygen-enriched gas by adsorbing nitrogen in the compressed air supplied from the air compressor (31). The first and second adsorption columns (34) and (35) are filled with an adsorbent adsorbing nitrogen during pressurization, and desorbing the adsorbed nitrogen during depressurization.

The adsorbent may be comprised of porous zeolite having pores with a diameter that is, e.g., smaller than the diameter (of 3.0 angstrom) of nitrogen molecules and larger than the diameter (of 2.8 angstrom) of oxygen molecules. Use of the zeolite having such a diameter may adsorb nitrogen in the air.

In the pores of zeolite, cations exist, and thus, an electric field has been generated to cause polarity. Therefore, zeolite has the property of adsorbing polarity molecules such as water molecules. As a result, moisture in the air is also adsorbed onto the adsorbent. The moisture adsorbed onto the adsorbent is desorbed, together with nitrogen, from the adsorbent during the desorption operation. As a result, a gas mixture including moisture is supplied to the interior of the container (11). This may increase the humidity in the interior of the container (11). Furthermore, the adsorbent is regenerated, and therefore, may have its life extended.

If the first and second adsorption columns (34) and (35) are depressurized by the air compressor (31), the nitrogen adsorbed onto the adsorbent is desorbed. This produces a nitrogen-enriched gas, i.e., a gas mixture that has had its oxygen concentration lowered by including more nitrogen than the outside air does. This gas mixture may have a composition including 90% of nitrogen and 10% of oxygen, for example.

It is known that, in the first and second adsorption columns (34) and (35), as the pressure applied by the air compressor (31) increases, the amount of nitrogen adsorbed onto the adsorbent increases so much as to produce nitrogen gas with higher purity.

The apparatus disclosed in Patent Document 1 needs to produce a high-purity nitrogen gas having a nitrogen concentration of more than 99%. Thus, a pressurization pressure of the air compressor is set to be, e.g., about 827.6 kPa.

In contrast, according to this embodiment, a gas mixture including 90% of nitrogen and 10% of oxygen may be produced. Thus, the pressurization pressure of the air compressor (31) does not have to be as high as in the apparatus disclosed in Patent Document 1, but may be set to be about 150 kPa, for example. Thus, the size of the pressurization portion (31a) may be reduced.

Compared to the conventional apparatus, the apparatus of this embodiment needs, as an additional member, a depressurization portion (31b) desorbing nitrogen from the adsorbent. However, in order to desorb nitrogen from the adsorbent, the air does not have to be sucked so strongly, and it is sufficient to suck the air with a pressure of, e.g., about −50 kPa. Thus, the size of the depressurization portion (31b) may also be reduced. That is to say, the overall weight of the apparatus of this embodiment including the air compressor (31) with a small pressurization portion (31a) and a small depressurization portion (31b) may be lighter than that of the conventional device including a large air compressor.

The gas mixture is supplied to the interior of the container (11) through a gas mixture supply passage (44) as a supplier. The gas mixture supply passage (44) is provided with a check valve (44a).

The respective outlet ports of the first and second adsorption columns (34) and (35) communicate with an oxygen tank (39) via first and second check valves (37) and (38) preventing backflow.

The oxygen tank (39) temporarily retains the oxygen-enriched gas produced in the first and second adsorption columns (34) and (35). The outlet port of the oxygen tank (39) is connected to an oxygen exhaust passage (45) communicating with the exterior of the container (11). The oxygen exhaust passage (45) is provided with an orifice (61) and a check valve (45a). The oxygen-enriched gas retained in the oxygen tank (39) is depressurized in the orifice (61), and then is exhausted out of the container (11) through the oxygen exhaust passage (45).

Figure 5:
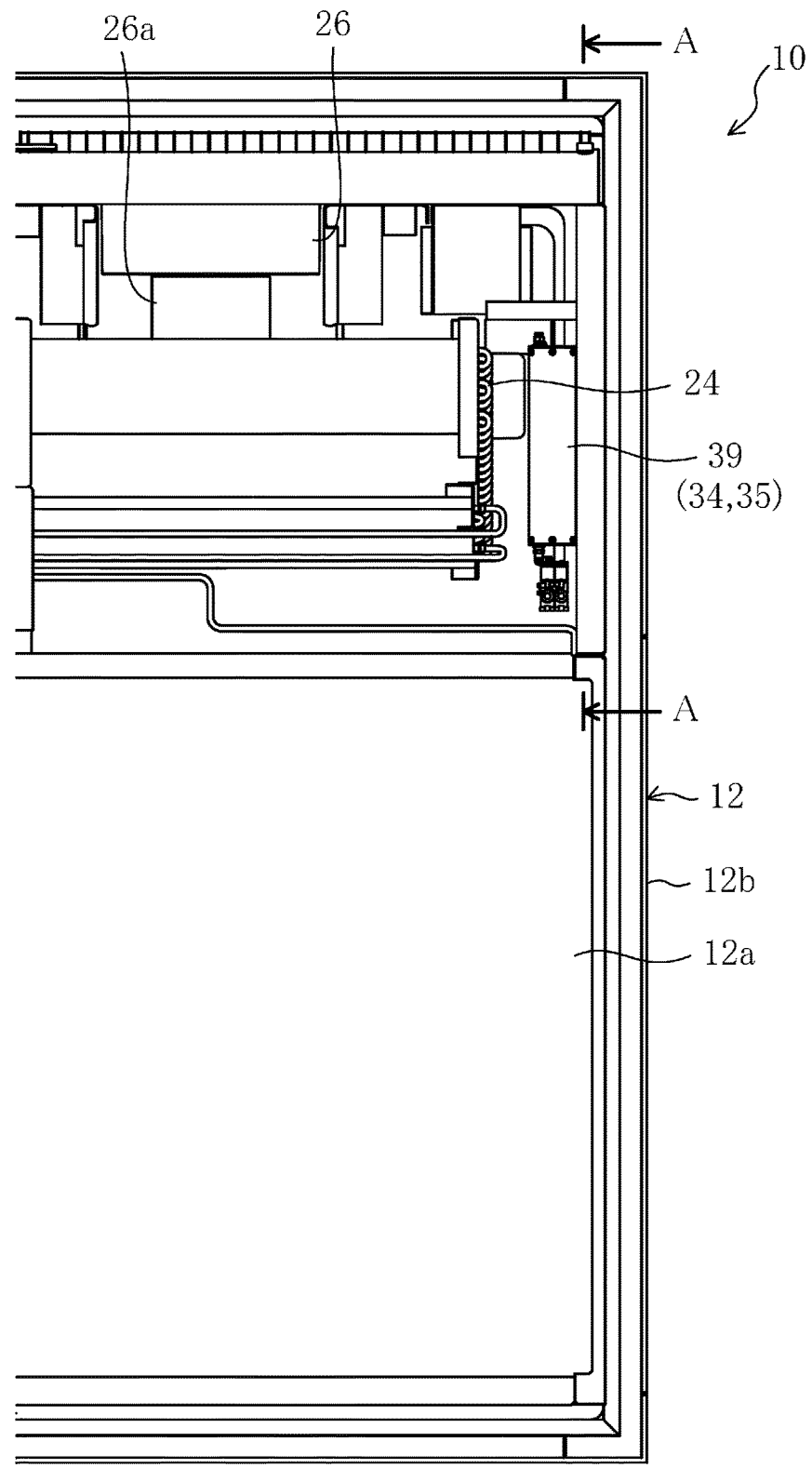
FIG. 5 is a front view of a casing, as viewed from the interior of the container.
Figure 6:
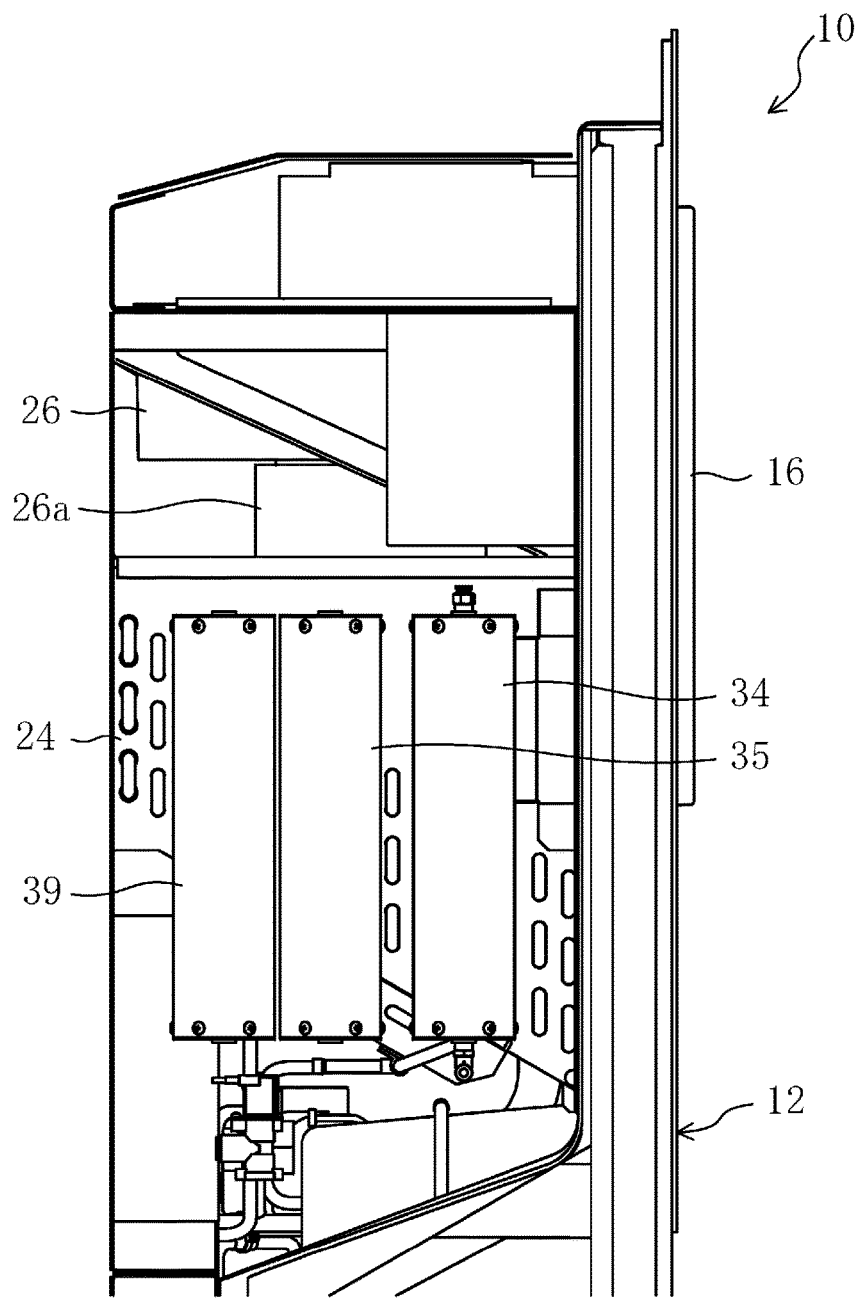
FIG. 6 is a cross-sectional view taken along the plane indicated by the arrows A-A of FIG. 5.

The first and second adsorption columns (34) and (35), and the oxygen tank (39) are disposed near the evaporator (24) in the internal storage space (S2). Specifically, as illustrated in FIGS. 5 and 6, the first and second adsorption columns (34) and (35), and the oxygen tank (39) are provided to stand upright in the gap between the sidewall of the container (11) and the evaporator (24), and are arranged side by side in the depth direction of the container (11).

The respective outlet ports of the first and second adsorption columns (34) and (35) communicate with each other via the purge valve (36). An orifice (62) is attached to the pipe between the outlet port of the first adsorption column (34) and the purge valve (36), and another orifice (62) is attached to the pipe between the outlet port of the second adsorption column (35) and the purge valve (36).

The purge valve (36) is used to introduce a predetermined quantity of the oxygen-enriched gas into the second adsorption column (35) on the low pressure side from the first adsorption column (34) on the high pressure side to discharge nitrogen from the adsorbent of the second adsorption column (35) on the low pressure side. The opening/closing operation of the purge valve (36) is controlled by the controller (50).

The controller (55) controls the operation of the gas mixture supply device (30) based on detection results obtained by the oxygen concentration detection sensor (51) and the carbon dioxide concentration detection sensor (52). It will now be described, with reference to the flowcharts of FIGS. 7 and 8, how the gas mixture supply device (30) operates.

Figure 7:
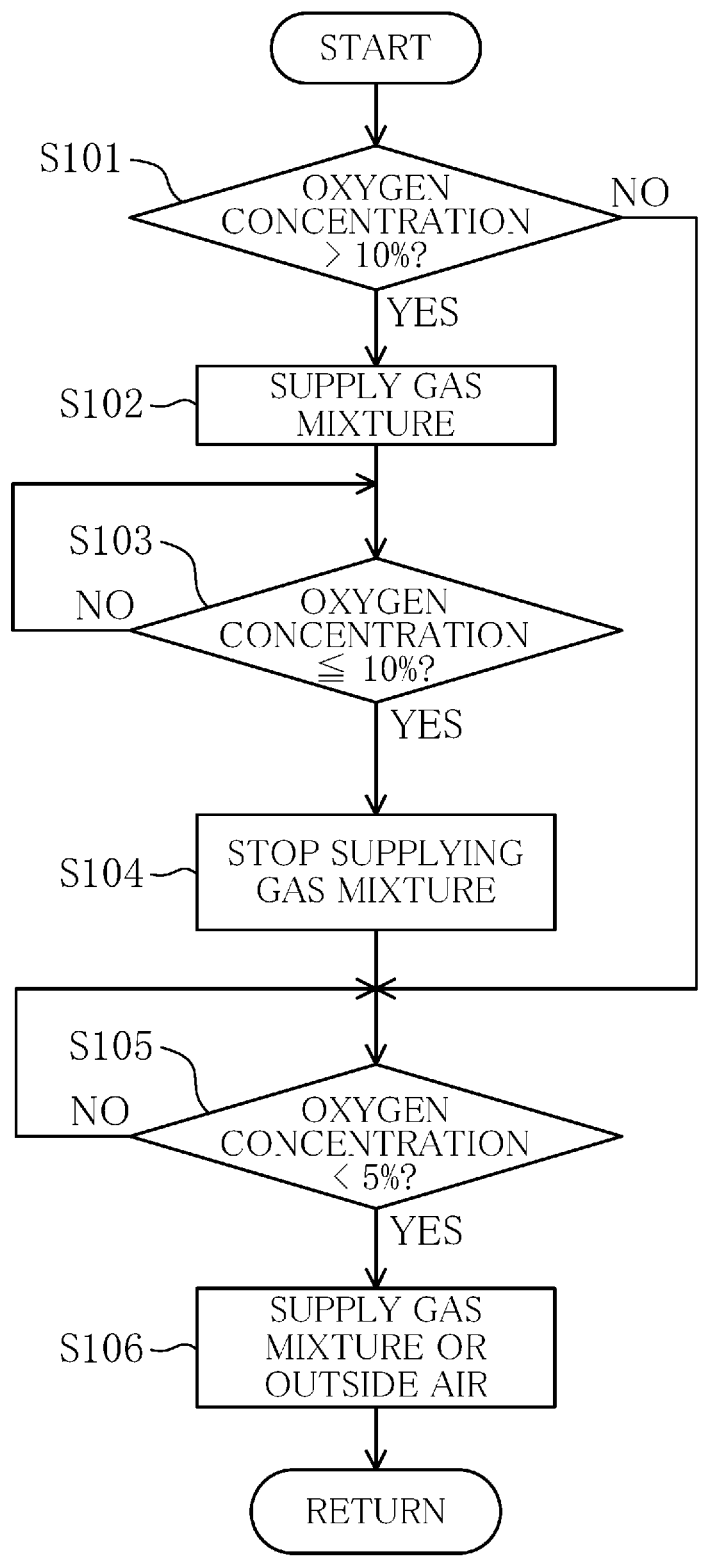
FIG. 7 is flowchart showing a procedure of controlling an oxygen concentration in the interior of the container.

FIG. 7 is a flowchart showing the procedure of controlling the oxygen concentration in the interior of the container. As shown in FIG. 7, first, in Step S101, a determination is made whether or not the oxygen concentration detected by the oxygen concentration detection sensor (51) is higher than that of the gas mixture (including 10% of oxygen). If the answer in Step S101 is YES, the process proceeds to Step S102. If the answer in Step S101 is NO, the process proceeds to Step S105.

In Step S102, the gas mixture supply device (30) supplies the interior of the container (11) with the gas mixture (including 90% of nitrogen and 10% of oxygen). Then, the process proceeds to Step S103.

In Step S103, a determination is made whether or not the oxygen concentration detected by the oxygen concentration detection sensor (51) has decreased to be equal to or less than the oxygen concentration of the gas mixture (including 10% of oxygen). If the answer in Step S103 is YES, the process proceeds to Step S104. If the answer in Step S103 is NO, the gas mixture supply device (30) enters a standby state.

In Step S104, the supply of the gas mixture is stopped, and the process proceeds to Step S105. In this Step S104, respiration of plants (15) stored in the interior of the container (11) allows oxygen included in the interior of the container (11) to be taken into the plants (15), and the carbon dioxide to be released.

In Step S105, a determination is made whether or not the oxygen concentration detected by the oxygen concentration detection sensor (51) has decreased to be less than a target oxygen concentration (of 5%). In this embodiment, if the plants (15) are bananas, the target oxygen concentration is set to be 5%. If the plants (15) are avocados, however, it is recommended that the target concentration be set to be 3%.

If the answer in Step S105 is YES, the process proceeds to Step S106. If the answer in Step S105 is NO, the gas mixture supply device (30) enters a standby state.

In Step S106, the gas mixture supply device (30) supplies the interior of the container (11) with the gas mixture (including 90% of nitrogen and 10% of oxygen) or the intake portion (47) supplies the interior of the container (11) with outside air. Thereafter, the series of process steps described above is repeatedly performed all over again. Optionally, in Step S106, the supply of the gas mixture and the supply of the outside air may be simultaneously performed.

Figure 8:
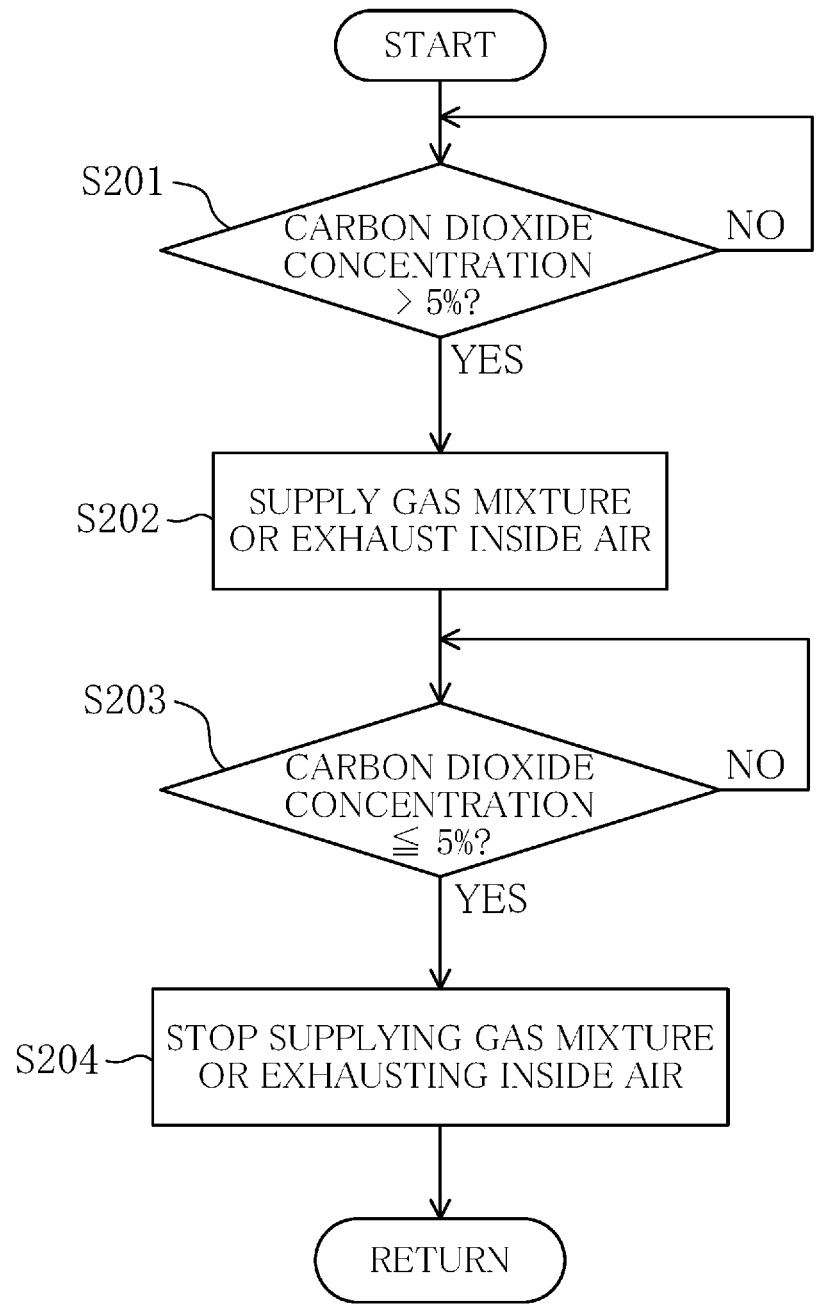
FIG. 8 is a flowchart showing a procedure of controlling a carbon dioxide concentration in the interior of the container.

FIG. 8 is a flowchart showing the procedure of controlling the carbon dioxide concentration in the interior of the container. As shown in FIG. 8, first, in Step S201, a determination is made whether or not the carbon dioxide concentration detected by the carbon dioxide concentration detection sensor (52) is higher than a predetermined target carbon dioxide concentration (of 5%). In this embodiment, if the plants (15) are bananas, the target concentration of carbon dioxide is set to be 5%. If the plants (15) are avocados, it is recommended that the target concentration be set to be 10%.

If the answer in Step S201 is YES, the process proceeds to Step S202. If the answer in Step S201 is NO, the gas mixture supply device (30) enters a standby state.

In Step S202, the gas mixture supply device (11) supplies the interior of the container (11) with the gas mixture (including 90% of nitrogen and 10% of oxygen) or the exhaust portion (46) exhausts air out of the interior of the container (11). Then, the process proceeds to Step S203. Optionally, in Step S202, the supply of the gas mixture and the exhaust of the inside air may be simultaneously performed.

In Step S203, a determination is made whether or not the carbon dioxide concentration detected by the carbon dioxide concentration detection sensor (52) has decreased to be equal to or less than the target carbon dioxide concentration. If the answer in Step S203 is YES, the process proceeds to Step S204. If the answer in Step S203 is NO, the gas mixture supply device (30) enters a standby state.

In Step S204, the supply of the gas mixture is stopped or the exhaust of the inside air is stopped. Thereafter, the series of process steps described above is repeatedly performed all over again.

As can be seen, according to the container refrigeration apparatus (10) of this embodiment, a gas mixture with a lower oxygen concentration than the outside air is supplied into the container (11). This enables reducing a decrease in the degree of freshness of the plants (15) by reducing the magnitude of variation in the oxygen concentration in the container (11) so much as to easily maintain the oxygen concentration in the container (11) in the vicinity of a target concentration.

In this embodiment, a gas mixture (including 90% of nitrogen and 10% of oxygen) where the oxygen concentration is lower than that of the outside air and is higher than a target oxygen concentration (of 5%) is supplied into the container (11) to reduce the oxygen concentration in the interior of the container (11) to 10%. Thereafter, the oxygen concentration is reduced to the target oxygen concentration (of 5%) by respiration of plants (15).

Thus, compared to the case of producing a gas mixture including 99% of nitrogen and 1% of oxygen, the equipment does not have to be so bulky. This may reduce the size and cost of the apparatus.

In this embodiment, if the oxygen concentration in the container (11) goes lower than the target oxygen concentration (of 5%), the gas mixture supply device (30) supplies the interior of the container (11) with the gas mixture (including 90% of nitrogen and 10% of oxygen) or the intake portion (47) supplies the interior of the container (11) with outside air to increase the oxygen concentration in the interior of the container (11) up to the target concentration. Thus, respiration disorders of the plants (15) are avoidable.

In this embodiment, if the carbon dioxide concentration in the container (11) is higher than the target concentration, the gas mixture supply device (30) supplies the interior of the container (11) with the gas mixture (including 90% of nitrogen and 10% of oxygen) or the exhaust portion (46) exhausts air out of the container (11). Thus, the carbon dioxide concentration in the interior of the container (11) is reduced so much as to be maintained in the vicinity of the target concentration. This enables maintaining the degree of freshness of the plants (15).

<<Variation>>

Figure 9:
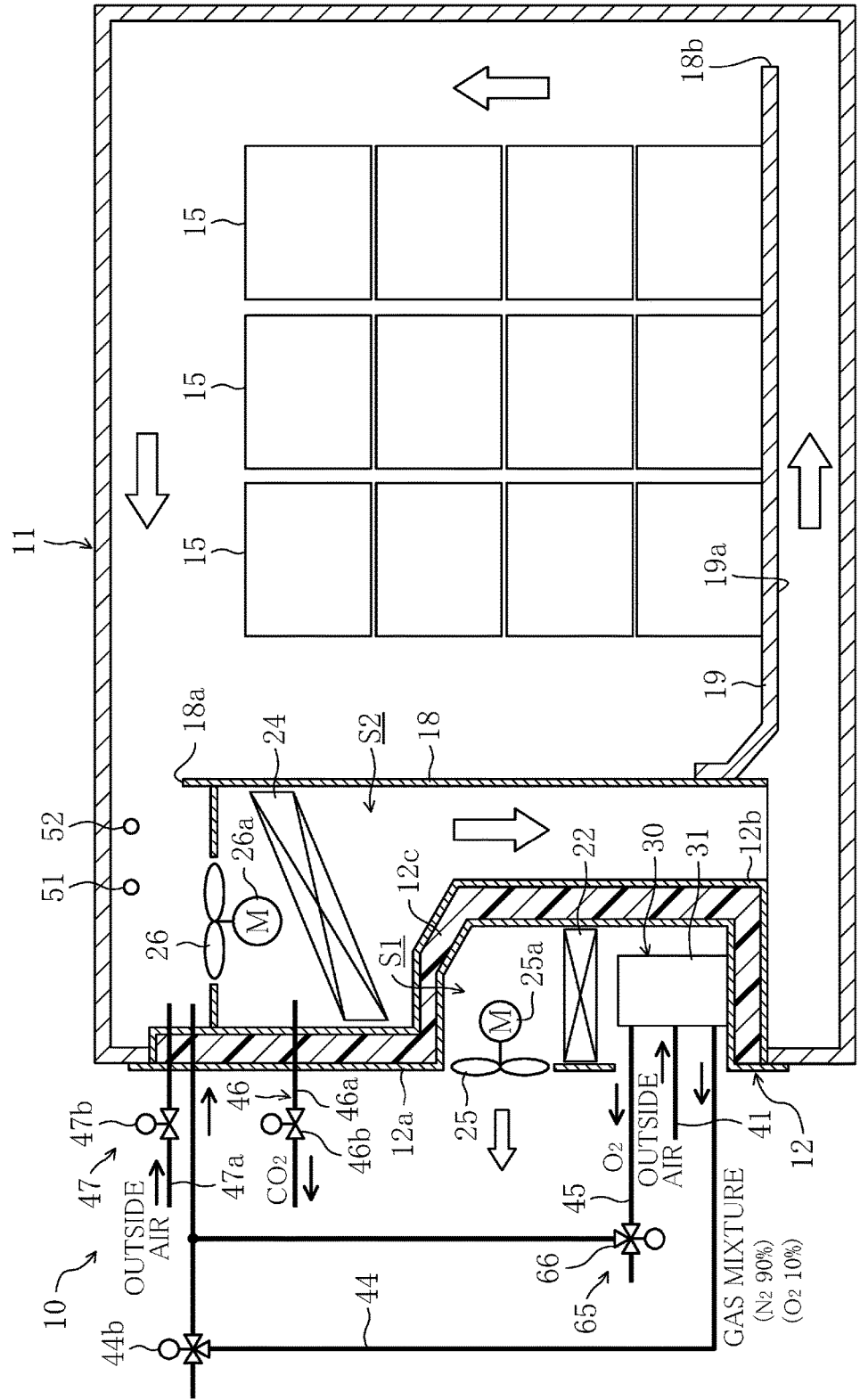
FIG. 9 is a side cross-sectional view illustrating a configuration of a container refrigeration apparatus according to a variation.

FIG. 9 is a side cross-sectional view illustrating a configuration of a container refrigeration apparatus according to a variation. This variation is the same as the first embodiment except that, if the oxygen concentration detected by the oxygen concentration detection sensor (51) is lower than a target concentration, oxygen gas, instead of the gas mixture or outside air, is supplied to the interior of the container (11). Thus, in the following description, like reference characters will be used to denote the same elements as those of the first embodiment, and only their differences will be described.

As illustrated in FIG. 9, the container refrigeration apparatus (10) includes an oxygen supplier (65) supplying oxygen gas into the container (11). The oxygen supplier (65) includes an oxygen tank (39) (see FIG. 4), an oxygen exhaust passage (45), and a three-way valve (66) connected to the oxygen exhaust passage (45).

Another three-way valve (44b) is connected to the gas mixture supply passage (44). The downstream end of the oxygen exhaust passage (45) is connected to a point downstream of the three-way valve (44b) in the gas mixture supply passage (44). The oxygen gas stored in the oxygen tank (39) is supplied into the container (11) through the oxygen exhaust passage (45) and the gas mixture supply passage (44).

The opening/closing operation of the three-way valve (66) in the oxygen exhaust passage (45) and the three-way valve (44b) of the gas mixture supply passage (44) is controlled by the controller (50) (see FIG. 4). Specifically, if the gas mixture is going to be supplied into the container (11), the controller (55) switches the three-way valve (44b) such that the gas mixture flowing through the gas mixture supply passage (44) goes toward the interior of the container (11), and also switches the three-way valve (66) such that the oxygen gas flowing through the oxygen exhaust passage (45) is exhausted out of the container (11).

If the oxygen concentration detected by the oxygen concentration detection sensor (51) is lower than the target concentration, the controller (55) switches the three-way valve (44b) such that the gas mixture flowing through the gas mixture supply passage (44) is exhausted out of the container (11), and also switches the three-way valve (66) such that the oxygen gas flowing through the oxygen exhaust passage (45) goes toward the interior of the container (11). This enables increasing the oxygen concentration in the interior of the container (11) to the target concentration by supplying the oxygen gas into the container (11).

In this variation, the same connection port is used as both a connection port for supplying oxygen and a connection port for supplying the gas mixture. However, a connection port for supplying oxygen may be provided separately to connect the oxygen exhaust passage (45) directly to the interior of the container (11).

Second Embodiment

Figure 10:
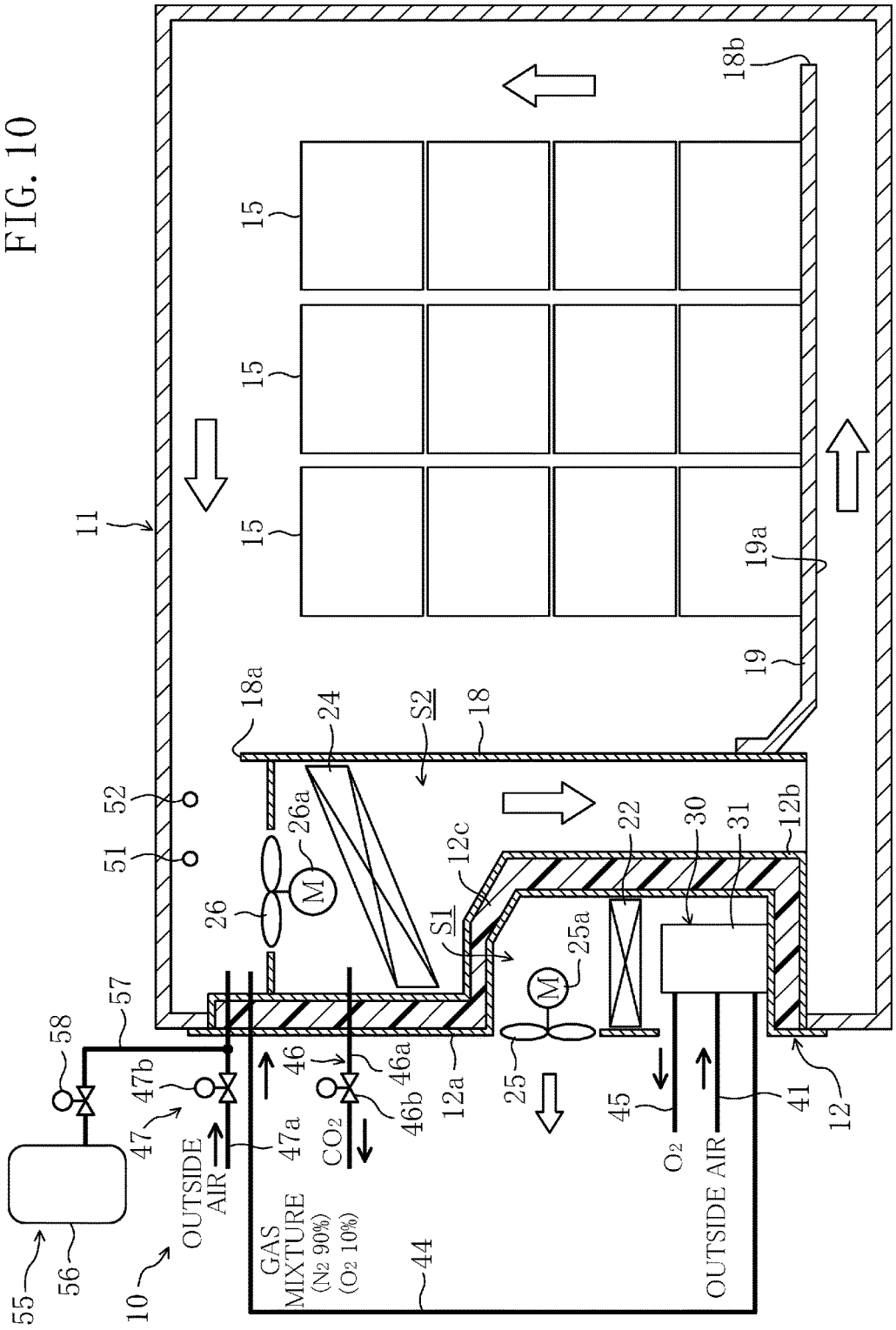
FIG. 10 is a side cross-sectional view illustrating a configuration of a container refrigeration apparatus according to a second embodiment.

FIG. 10 is a side cross-sectional view illustrating a configuration of a container refrigeration apparatus according to a second embodiment. In the following description, like reference characters will be used to denote the same elements as those of the first embodiment, and only their difference will be described.

As illustrated in FIG. 10, the container refrigeration apparatus (10) includes an inert gas supply device (55) supplying the interior of the container (11) with an inert gas. The inert gas is a gas used to reduce the oxygen concentration in the container (11) without causing an increase in the carbon dioxide concentration in the interior of the container (11), and may be nitrogen gas, for example.

The inert gas supply device (55) functioning as an inert gas supplier includes a nitrogen cylinder (56) filled with nitrogen gas, a nitrogen supply pipe (57) supplying the nitrogen gas of the nitrogen cylinder (56) to the interior of the container (11), and an on-off valve (58) attached to this nitrogen supply pipe (57). The opening/closing operation of the on-off valve (58) is controlled by the controller (55).

The downstream end of the nitrogen supply pipe (57) is connected to a point downstream of the intake valve (47b) in the intake pipe (47a). The nitrogen gas in the nitrogen cylinder (56) is supplied to the interior of the container (11) through the nitrogen supply pipe (57) and the intake pipe (47a). This allows a single connection port to function as a connection port for supplying nitrogen and a connection port for supplying outside air. Optionally, a connection port for supplying nitrogen may be provided separately to connect the nitrogen supply pipe (57) directly to the interior of the container (11).

Figure 11:
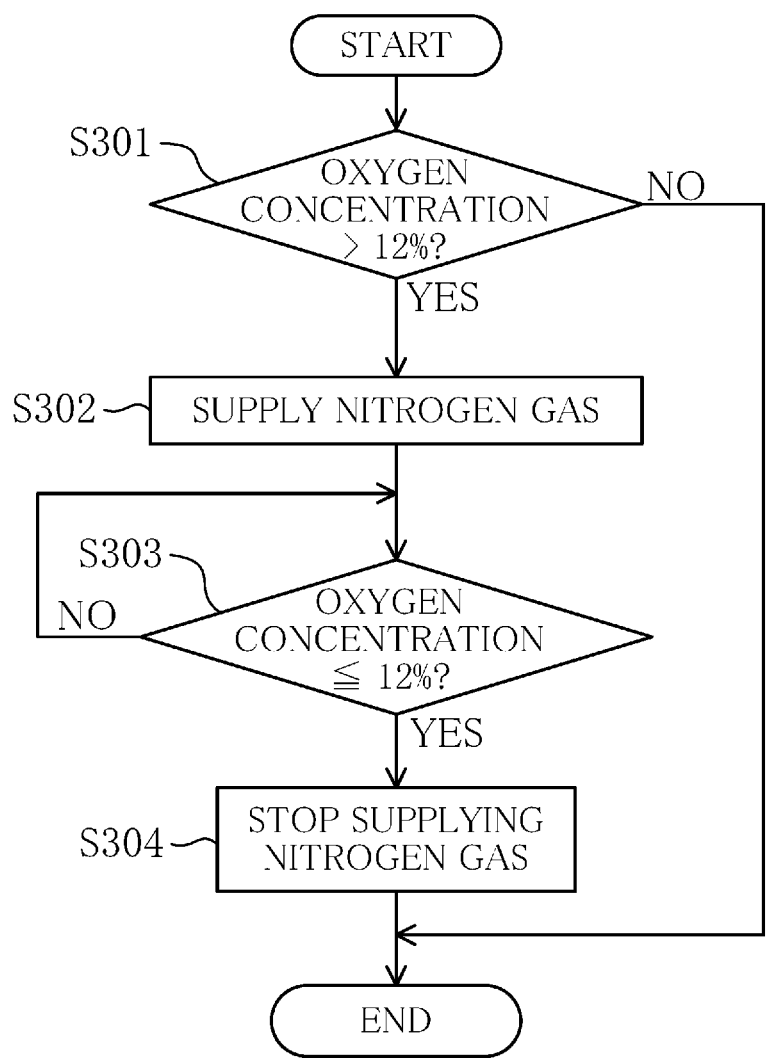
FIG. 11 is a flowchart showing a procedure of controlling an oxygen concentration in the interior of the container using nitrogen gas.

FIG. 11 is a flowchart showing the procedure of controlling the oxygen concentration in the interior of the container using nitrogen gas. As shown in FIG. 11, first, in Step S301, a determination is made whether or not the oxygen concentration detected by the oxygen concentration detection sensor (51) is close to the oxygen concentration of the gas mixture (including 10% of oxygen), e.g., whether or not the oxygen concentration in the interior of the container (11) is higher than 12%. If the answer in Step S301 is YES, the process proceeds to Step S302. If the answer in Step S301 is NO, the process ends.

In Step S302, nitrogen gas is supplied from the nitrogen cylinder (56) into the container (11), and the process proceeds to Step S303.

In Step S303, a determination is made whether or not the oxygen concentration detected by the oxygen concentration detection sensor (51) has decreased to be equal to or less than 12%. If the answer in Step S303 is YES, the process proceeds to Step S304. If the answer in Step S303 is NO, the gas mixture supply device (30) enters a standby state.

In Step S304, the supply of the nitrogen gas is stopped to end the process. After the supply of the nitrogen gas is stopped, the oxygen concentration is controlled in the same or similar procedure as/to the flowchart illustrated in FIG. 7.

As can be seen, according to the second embodiment, the oxygen concentration in the interior of the container (11) is reduced to the vicinity of the oxygen concentration of the gas mixture by supplying nitrogen gas into the container (11), and then, is further reduced to the target concentration by supplying the gas mixture. This may shorten the time it takes for the oxygen concentration in the container (11) to reach the target concentration compared to the case where the oxygen concentration in the interior of the container (11) is reduced to the target concentration with only the gas mixture.

Other Embodiments

The above embodiments may be modified in the following manner.

In the embodiments described above, the air compressor (31) has the pressurization portion (31a) and the depressurization portion (31b), and the depressurization portion (31b) of the air compressor (31) sucks nitrogen-enriched gas. However, a suction pump sucking the nitrogen-enriched gas may be provided separately.

Also, although two adsorption columns, namely, the first and second adsorption columns (34) and (35), are used to adsorb/desorb nitrogen in the embodiments described above, the number of the adsorption columns to use is not limited to two. For example, six adsorption columns may be used as well.

In this embodiment, the gas mixture is supplied into the container (11) to reduce the oxygen concentration in the interior of the container (11) to the oxygen concentration of the gas mixture (including 10% of oxygen). However, the supply of the gas mixture may be stopped after the oxygen concentration has been reduced to the vicinity of the oxygen concentration of the gas mixture (including, for example, 12% of oxygen).

INDUSTRIAL APPLICABILITY

As can be seen from the foregoing description, the present invention is useful for container refrigeration apparatuses.

DESCRIPTION OF REFERENCE CHARACTERS

10 Container Refrigeration Apparatus
11 Container
15 Plant
20 Refrigerant Circuit
30 Gas Mixture Supply Device (Gas Mixture Supplier)
46 Exhaust Portion
47 Intake Portion 51 Oxygen Concentration Detection Sensor (Oxygen Concentration Detector)
52 Carbon Dioxide Concentration Detection Sensor (Carbon Dioxide Concentration Detector)
55 Inert Gas Supply Device (Inert Gas Supplier)
65 Oxygen Supplier

The invention claimed is:

1. A container refrigeration apparatus which includes a refrigerant circuit performing a refrigeration cycle, and which is attached to a container that stores plants to cool air in the interior of the container, the container refrigeration apparatus comprising:
   an oxygen concentration detector which detects an oxygen concentration in the interior of the container; and
   a gas mixture supplier which supplies the interior of the container with a gas mixture having a higher nitrogen concentration and a lower oxygen concentration than outside air, where the oxygen concentration of the gas mixture is higher than a predetermined target concentration, wherein
   the gas mixture supply device is configured to:
      reduce the oxygen concentration in the interior of the container by supplying the interior of the container with the gas mixture if the oxygen concentration detected by the oxygen concentration detector is higher than the oxygen concentration of the gas mixture; and
      stop supplying the gas mixture when the oxygen concentration in the interior of the container equals the oxygen concentration of the gas mixture and until the oxygen concentration in the interior of the container is reduced to the target concentration by respiration of the plants absorbing oxygen in the air and releasing carbon dioxide into the air.

2. The container refrigeration apparatus of claim 1, wherein the gas mixture supply device is configured to increase the oxygen concentration in the interior of the container to the target concentration by supplying the interior of the container with the gas mixture if the oxygen concentration detected by the oxygen concentration detector is lower than the target concentration.

3. The container refrigeration apparatus of claim 1, further comprising
   an intake portion through which the outside air is introduced into the interior of the container, wherein
   the intake portion is configured to increase the oxygen concentration in the interior of the container to the target concentration by supplying the interior of the container with the outside air if the oxygen concentration detected by the oxygen concentration detector is lower than the target concentration.

4. The container refrigeration apparatus of claim 1, further comprising
   an oxygen supplier which supplies the interior of the container with oxygen gas, wherein
   the oxygen supplier is configured to increase the oxygen concentration in the interior of the container to the target concentration by supplying the interior of the container with the oxygen gas if the oxygen concentration detected by the oxygen concentration detector is lower than the target concentration.

5. The container refrigeration apparatus of claim 1, further comprising:
   a carbon dioxide concentration detector which detects a carbon dioxide concentration in the interior of the container; and
   an exhaust portion configured to exhaust the air in the interior of the container out of the container if the carbon dioxide concentration detected by the carbon dioxide concentration detector is higher than a predetermined target concentration.

6. The container refrigeration apparatus of claim 1, further comprising
   a carbon dioxide concentration detector which detects a carbon dioxide concentration in the interior of the container, wherein
   the gas mixture supply device is configured to supply the interior of the container with the gas mixture with a higher oxygen concentration than the air in the interior of the container if the carbon dioxide concentration detected by the carbon dioxide concentration detector is higher than the predetermined target concentration.

7. The container refrigeration apparatus of claim 1, further comprising
   an inert gas supplier which supplies the interior of the container with an inert gas used to reduce the oxygen concentration in the interior of the container without causing an increase in the carbon dioxide concentration in the interior of the container, wherein
   the inert gas supplier is configured to reduce the oxygen concentration in the interior of the container by supplying the interior of the container with the inert gas before the gas mixture supply device supplies the interior of the container with the gas mixture.

8. The container refrigeration apparatus of claim 7, wherein the inert gas is nitrogen gas.

* * * * *